Nov. 14, 1944.  C. C. FUERST  2,362,547
DIAPHRAGM SHUTTER
Filed June 3, 1943  2 Sheets-Sheet 1
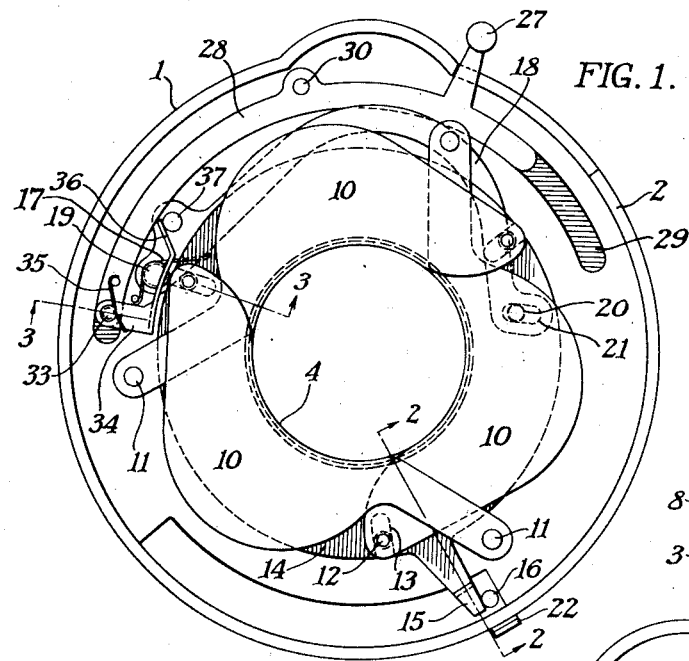
FIG. 1.
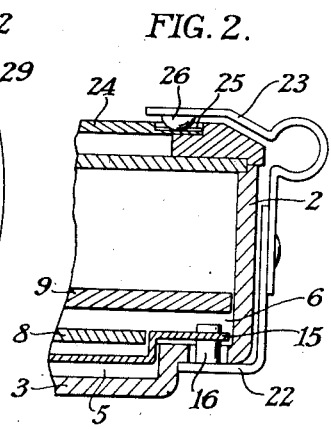
FIG. 2.
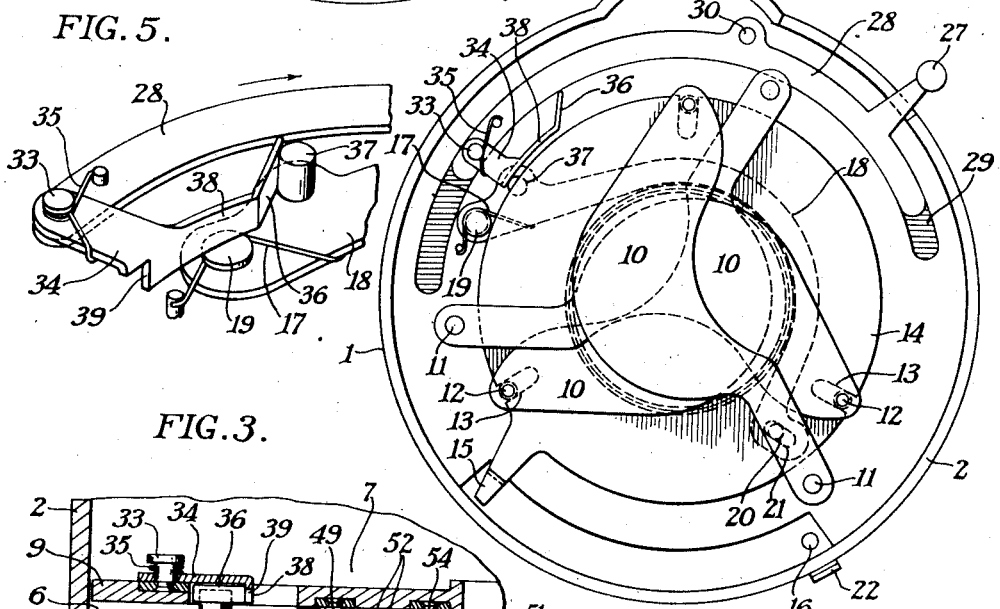
FIG. 4.
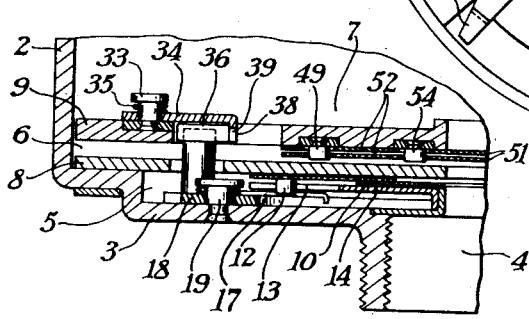
FIG. 5.
FIG. 3.
CARL C. FUERST
INVENTOR
BY
ATTORNEYS Nov. 14, 1944.　　C. C. FUERST　　2,362,547
DIAPHRAGM SHUTTER
Filed June 3, 1943　　2 Sheets-Sheet 2

CARL C. FUERST
INVENTOR

BY
ATTORNEYS

Patented Nov. 14, 1944

2,362,547

UNITED STATES PATENT OFFICE 2,362,547

DIAPHRAGM SHUTTER

Carl C. Fuerst, Rochester, N. Y., assignor to Eastman Kodak Company, Rochester, N. Y., a corporation of New Jersey Application June 3, 1943, Serial No. 489,485

7 Claims. (Cl. 95—63)

This invention relates to photography and more particularly to photographic shutters employing diaphragms. One object of my invention is to provide a diaphragm shutter construction in which the diaphragm leaves perform functions in addition to their usual function of controlling the diaphragm aperture. Another object of my invention is to provide a diaphragm structure which may be operated directly by the shutter setting lever. Another object of my invention is to provide a shutter diaphragm which may be moved from a normal position determining an exposure aperture and which may return automatically to a predetermined position after such movement. Another object is to provide a diaphragm shutter structure in which the diaphragm leaves automatically and completely close the exposure aperture during a portion of the setting movement of a shutter and in which shutter blades are momentarily opened. Other objects will appear from the following specification, the novel features being particularly pointed out in the claims at the end thereof.

It has been common knowledge that the best type of between-the-lens shutter is one in which the blades may be swung in only one direction to open and close an exposure aperture, but such shutters have heretofore been open to a number of objections. One objection is that, where a pivoted double-ended type of shutter blade is employed, if a blade moves in only one direction for making an exposure it must either make substantially one revolution, in which case the shutter casing must be large, or it may move through less than one revolution, in which case the blade must be moved in an opposite direction for setting the shutter. If this is done, the shutter leaves will open during the setting movement.

In order to overcome the disadvantages of prior shutters of this type, I have provided a shutter diaphragm in which the diaphragm leaves are so constructed that they may totally close the aperture and in which there is a connection between the shutter setting member and the diaphragm leaves so arranged that the diaphragm leaves will totally close the exposure opening during that part of the setting movement in which the shutter blades open and close. Thus, the diaphragm not only serves to "cap" the exposure opening while the shutter is being set, but, in addition, the diaphragm performs the usual function of determining the diaphragm opening which may be used for making an exposure.

Coming now to the drawings wherein like characters denote like parts throughout:

Fig. 1 is a fragmentary plan view showing a shutter diaphragm structure constructed in accordance with and embodying a preferred form of my invention;

Fig. 2 is a sectional view on an enlarged scale taken on line 2—2 of Fig. 1 and with some of the parts shown in elevation;

Fig. 3 is an enlarged fragmentary section taken on line 3—3 of Fig. 1 and with the parts shown on a somewhat exaggerated scale and thickness;

Fig. 4 is a view similar to Fig. 1 but with the parts in a different position;

Fig. 5 is a fragmentary perspective view of a portion of the diaphragm blade ring operating latch;

Figure 6:
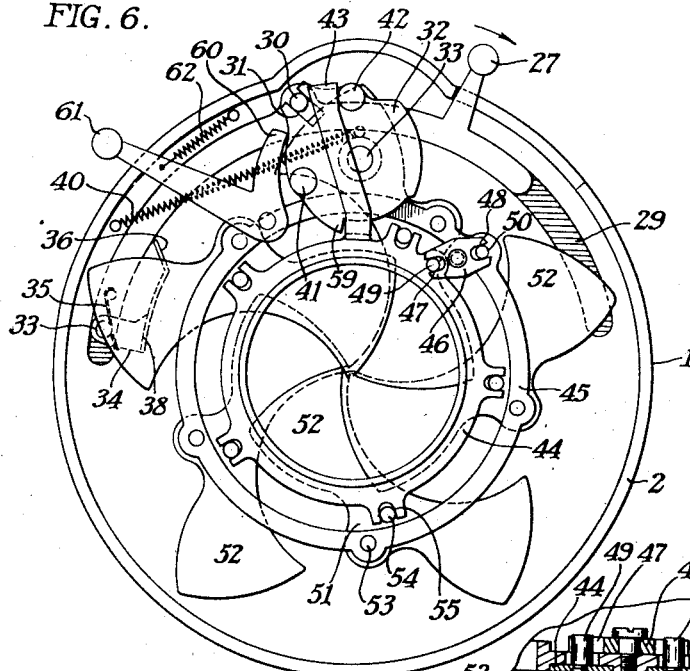
Fig. 6 is a view similar to Fig. 1 but taken through a different portion of the shutter showing a shutter blade driving mechanism used in connection with the diaphragm shown in Figs. 1 and 4.
Figure 8:
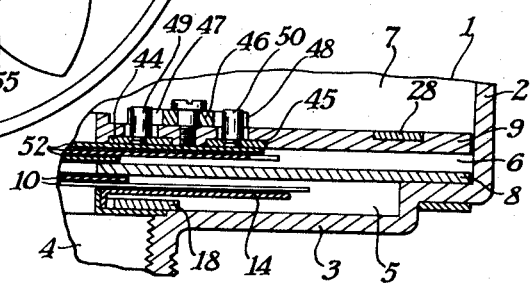
Fig. 8 is an enlarged fragmentary sectional view on line 8—8 of Fig. 7.

My invention consists broadly in providing a shutter including shutter blades of the double-ended type which are driven through less than one revolution to make an exposure. The shutter is of the setting type and, consequently, in order to set the shutter mechanism the shutter leaves are momentarily opened. To prevent fogging sensitized material, I provide an improved form of diaphragm in which the shutter leaves not only serve to regulate the usual diaphragm opening but, in addition, the diaphragm leaves totally close the exposure aperture each time the shutter is set to prevent unwanted light from entering the aperture during the setting operation. The present structure is for an improvement over the shutter shown in my copending application Serial No. 489,484, filed June 3, 1943, for Camera shutter, in which a separate set of leaves are used to cover the exposure opening during setting of the shutter.

My diaphragm shutter may consist of a shutter casing I provided with an upstanding flange 2, a bottom wall 3 and an exposure opening 4. The shutter casing I is divided into sections or compartments 5, 6 and 7 by means of mechanism plates 8 and 9 as best shown in Fig. 3.

The diaphragm structure is mounted in the compartment 5, and Fig. 1 shows this compartment with the mechanism plates 8 and 9 removed for the sake of clearness.

As indicated in Fig. 1, the diaphragm includes a number of diaphragm leaves 10, each of which is pivotally attached at 11 to the shutter and each of which includes a pin 12 and slot 13 connection with a diaphragm ring 14 which may be oscillated to open and close the diaphragm leaves. The diaphragm ring may include an arm 15 which may be normally moved toward an adjustable stop pin 16 by means of a suitable spring 17. In the form shown the spring may be attached to a diaphragm operating lever 18 pivoted at 19 and having a pin 20 and slot 21 connection with the diaphragm ring 14. The spring 17 tends to turn lever 18 in a counter-clockwise direction until the arm 15 strikes the pin 16.

The pin 16 may be carried as indicated in Fig. 2 by an arm 22 which extends upwardly and which has an arm 23 projecting over the shutter cover plate 24 which may be provided with notches 25 into which the protuberance 26 may snap in order to hold the pin 16 in any set position. It is to be understood that the shutter cover 24 carries a diaphragm scale graduated into the units of opening as is customary in photographic shutters.

Fig. 1 illustrates the diaphragm in its fully-opened position and, by moving the arm 22 in a clockwise direction, the pin 16 will be moved in a clockwise direction to reduce the aperture formed by the diaphragm leaves 10.

The diaphragm leaves will normally remain in the selected open position controlled by the pin 16 because of the spring 17. However, it is desirable to completely close the exposure opening 4 when a setting lever 27 is moved from its rest position in Fig. 1 to its set position in Fig. 4. The setting lever 27 is carried by an arcuate arm 28 which may move freely in the slotted guideway 29. It carries an upstanding pin 30 which engages a slot 31 in a master member 32 pivoted at 33 to the shutter mechanism plate 9.

The arcuate arm 28 also carries on a pin 33 a spring latch 34 normally held in the position shown in Fig. 1 by the spring 35. This spring latch includes a cam shaped extension 36 and the path of movement of this cam and arcuate arm 28 is such that in setting the shutter the cam is positioned to engage and move an upstanding pin 37 carried by the pivoted arm 18. When the setting lever 27 is moved in a clockwise direction from its Fig. 1 to its Fig. 4 position, the first part of this movement causes the cam 36 through its engagement with pin 37 to rapidly close the diaphragm blades to the position shown in Fig. 4. The blades remain in this position while the curved portion 38 of the latch holds the pin 37 in a position to hold the blades in their totally closed Fig. 4 position, but when the pin 37 reaches the notch 39 which is immediately following its Fig. 4 position, the spring 17 will swing the arm 18 in a counter-clockwise direction, causing the blades to swing from their Fig. 4 position to the position determined by the arm 15 and the stop 16. Therefore, the movement of the setting lever 27 causes the blades to close and to remain closed until the setting movement is nearly complete at which time the diaphragm blades may swing open under the impulse of their own spring.

The reason for this is that, with a shutter driving mechanism of the type which will now be described, the shutter blades open and close during the period in which the diaphragm leaves have been held totally closed and in their Fig. 4 position.

The shutter leaf driving mechanism includes the master member 32 which is turned about its pivot 33 when the setting lever 27 is moved through the contact of the pin 30 in the slot 31. A relatively powerful spring 40 tends to turn the master member 32 in a counter-clockwise direction. The master member includes a pair of driving pins 41 and 42 arranged at opposite sides of a lever 43 forming a part of a blade ring 44. Thus, when turning in a clockwise direction, the pin 41 moves the arm 43 in a clockwise direction. This turns the blade ring 44 in the same direction and a second blade ring 45 in an opposite direction through the rocker arm 46, this arm having slots 47 and 48 engaging pins 49 and 50 carried by the blade rings 44 and 45. Thus the blade rings move together in opposite directions while the shutter is being set and consequently the shutter blades 51 are opened and closed. Each shutter blade is of the double-ended variety, the two ends 52 of the blade being adapted to be successively positioned across the exposure aperture 4 to make an exposure. Each shutter blade is pivoted at 53 to the blade ring 45 and carries a pin 54 engaging a slot 55 in the blade ring 44. One of the reasons for this double blade ring construction is that the blades can be moved at a very high degree of rapidity, since they only move in a single direction in making an exposure and in an opposite direction during the setting movement. It is for this reason that the diaphragm blades are used as an exposure aperture cover during the setting movement.

Figure 7:
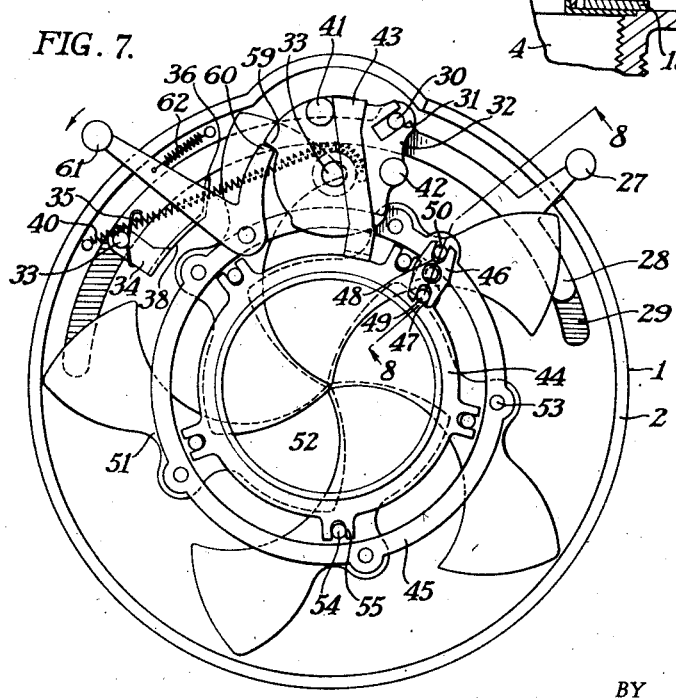
Fig. 7 is a view similar to Fig. 6, but with the parts in a different position.

The setting operation of the blades is as follows. The setting lever 27 is moved from its Fig. 6 to its Fig. 7 position. During this movement the pin 30, through its engagement with slot 31, moves the master member 32 in a clockwise direction until the latch element 59 of the master member is engaged by the latch element 60 of the trigger 61. These latch elements hold the master member in its set position shown in Fig. 7. A spring 62 tends to move the trigger into its latching position. As this movement of the master member occurs, the pin 41 moves the blade ring actuating arm 43 to the position shown in Fig. 7. However, since the pin 41 moves a material distance before it engages the arm 43, the diaphragm blades have already reached their Fig. 4 position before the shutter blades 52 start to open and close during the setting movement. By the time the lever 27 has completed its setting movement, the diaphragm lever pin 37 has slipped through the notch 39 of the latch 38 and the diaphragm blades under their own spring 17 open up to the predetermined stop.

The shutter is then ready for an exposure. By depressing the trigger 61 in the direction shown by the arrow (Fig. 7), the master member 32 moves rapidly under the impulse of its spring 40 in a counter-clockwise direction. Pin 42 traveling rapidly strikes the arm 43 which quickly oscillates the blade rings 44 and 45 in opposite directions through movement of the rocker arm 46. The shutter blades 52 move from their Fig. 7 to their Fig. 6 position.

From the foregoing description, it will be seen that I have provided a diaphragm shutter construction in which the diaphragm, as usual, determines the exposure opening and in which the diaphragm closes the aperture completely during all of that time in which the shutter blades open and close as the shutter is being set. Consequently, I am able to use with few, if any, extra parts a shutter of the type in which the shutter blades move in one direction only in making an exposure, so that I can obtain much higher speeds than are customarily obtainable with shutters of the between-the-lens type.

I claim:

1. In a diaphragm shutter, the combination with a shutter casing including an exposure opening, of shutter leaves pivotally mounted and movable to open and close the opening, mechanism for moving the shutter leaves, a setting lever for said mechanism to condition the shutter for exposure, said setting lever moving the shutter leaves in setting the shutter, a movable diaphragm, a stop for determining the diaphragm opening, means tending to move the diaphragm against the stop, and a latch carried by the setting lever for closing the exposure aperture during that part of the setting operation in which the shutter leaves are opened by the setting lever.

2. In a diaphragm shutter, the combination with a shutter casing including an exposure opening, of shutter leaves pivotally mounted and movable to open and close the opening, mechanism for moving the shutter leaves, a setting lever for said mechanism to condition the shutter for exposure, said setting lever moving the shutter leaves in setting the shutter, a movable diaphragm, a spring tending to move the diaphragm in one direction and means included in the shutter setting lever for closing the diaphragm momentarily as the shutter blades open momentarily in setting the shutter.

3. In a diaphragm shutter, the combination with a shutter casing having an exposure aperture therein, of a plurality of shutter leaves pivotally mounted to move for opening and closing the aperture, a master member, a setting lever for tensioning the master member, mechanism for driving the shutter leaves in one direction to make an exposure and in an opposite direction in setting the shutter, a movable diaphragm for closing and determining the size of opening of the exposure aperture, a spring tending to open the diaphragm, and slip off connections between the setting lever for the master member and the diaphragm for moving the diaphragm to momentarily close the exposure aperture when the shutter leaves open in setting the shutter.

4. In a diaphragm shutter, the combination with a shutter casing including an exposure opening, of shutter leaves pivotally mounted to open and close said opening, mechanism for moving the shutter leaves, a setting lever for said mechanism to condition the mechanism for an exposure and moving the shutter leaves in setting the shutter, a movable diaphragm means tending to move the diaphragm toward an open position, a latch carried by the setting lever positioned to engage and move the diaphragm against the means tending to move the diaphragm toward an open position, said shutter mechanism and said setting lever including a means for moving the shutter leaves operable only after the setting lever is moved in a setting direction a material distance, said latch engaging and completely moving the diaphragm to a closed position before the shutter leaves are moved and during the first part of the movement of the setting lever in which said lever may move a material distance before moving said shutter leaves.

5. In a diaphragm shutter, the combination with a shutter casing including an exposure opening, of shutter leaves pivotally mounted to open and close said opening, mechanism for moving the shutter leaves, a setting lever for said mechanism to condition the mechanism for an exposure and moving the shutter leaves in setting the shutter, a movable diaphragm ring, a diaphragm ring moving arm, a spring tending to move the diaphragm ring towards an open position, a latch element on the diaphragm ring moving arm, a latch element carried by the setting member and movable through a path adjacent said ring moving arm, said latch element and latch lying adjacent before setting the mechanism by the setting lever, the first part of the movement of the setting lever moving the diaphragm ring by said latch completely closing said diaphragm, the setting lever and mechanism for actuating the shutter leaves including elements cooperating to move the mechanism from the setting lever only after said setting lever has first closed the diaphragm.

6. In a shutter of the type including a casing, shutter leaves in the casing, mechanism for operating said shutter leaves and a setting lever for conditioning said mechanism for making an exposure, the combination with said setting lever, of a diaphragm comprising pivotally mounted leaves, a diaphragm leaf moving member to which the diaphragm leaves are operably connected, a lever for moving said diaphragm leaf moving member, said lever being pivotally mounted adjacent the path of the setting lever, a protuberance on the lever for moving the diaphragm leaf moving member, and a cam carrying spring latch member mounted to immediately engage and move said protuberance during the first part of the setting movement of the setting lever, said mechanism for operating the shutter being moved to a set position after the diaphragm leaf moving mechanism protuberance is moved to its full extent.

7. In a shutter of the type including a casing, shutter leaves in the casing, mechanism for operating said shutter leaves and a setting lever for conditioning said mechanism for making an exposure, the combination with said setting lever, of a diaphragm comprising pivotally mounted leaves, a diaphragm leaf moving member to which the diaphragm leaves are operably connected, a lever for moving said diaphragm leaf moving member, said lever being pivotally mounted adjacent the path of the setting lever, a protuberance on the lever for moving the diaphragm leaf moving member, and a cam carrying spring latch member mounted to immediately engage and move said protuberance during the first part of the setting movement of the setting lever, said mechanism for operating the shutter being moved to a set position after the diaphragm leaf moving mechanism protuberance is moved to its full extent, said cam carrying spring latch moving against its spring when contacting with said protuberance in moving in an opposite direction.

CARL C. FUERST.